UNITED STATES PATENT OFFICE.

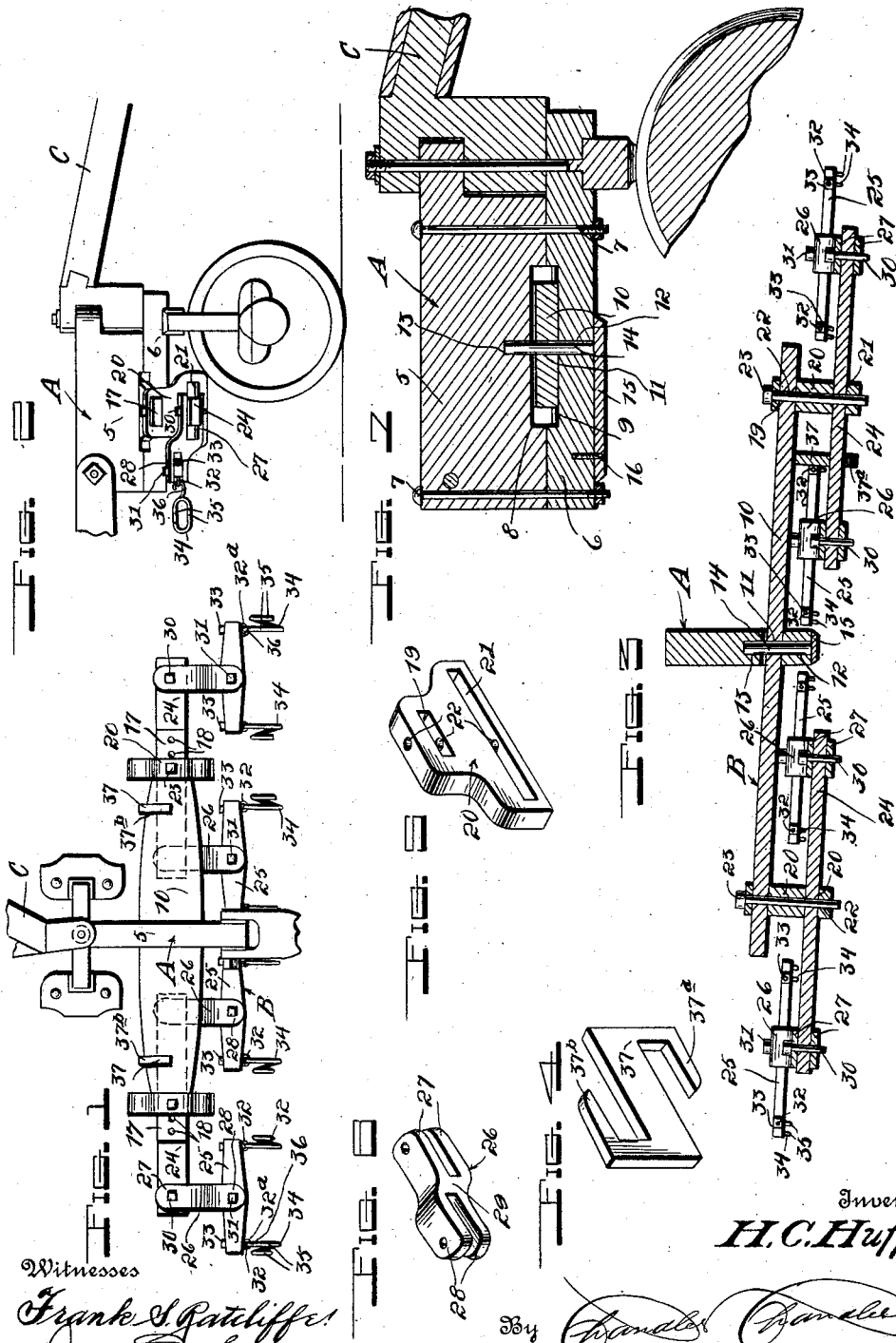

HIRAM C. HUFF, OF CLAREMONT, VIRGINIA.

DRAFT-EVENER.

1,048,170.  Specification of Letters Patent.  Patented Dec. 24, 1912.

Original application filed March 2, 1912, Serial No. 681,084. Divided and this application filed June 19, 1912. Serial No. 704,598.

*To all whom it may concern:*

Be it known that I, HIRAM C. HUFF, a subject of the King of Great Britain, residing at Claremont, in the county of Surry, State of Virginia, have invented certain new and useful Improvements in Draft-Eveners; and I do hereby declare the following to be a full, clear, and exact description of the invention, such as will enable others skilled in the art to which it appertains to make and use the same.

This invention relates to improvements in draft eveners, and forms a divisional application of my pending application No. 681,084, filed March 2, 1912.

The principal object of the invention is to provide a draft evener by means of which two, three or four draft animals may be readily connected thereto.

Another object of the invention is to provide a draft evener in which the swingletrees are disposed below the plane of the main evener bar, so as to permit said bar to readily turn under the draft pole without interference.

A further object of the invention is to provide a lock of novel construction adapted to be associated with either or both of the double-trees of the evener when it is desired to change the evener from a four horse evener to a two or three horse evener.

A still further object of the invention is to provide a draft evener of the character described which is composed of a minimum number of parts, is therefore simple in construction, and is cheap to manufacture.

With these and other objects in view, the invention consists in the construction and novel combination of parts hereinafter fully described, illustrated in the accompanying drawing and pointed out in the claims hereto appended; it being understood that various changes in the form, proportion, size and minor details of construction within the scope of the claims may be resorted to without departing from the spirit or sacrificing any of the advantages of the invention.

In the drawing: Figure 1 is a top plan view of a draft evener constructed in accordance with my invention, the view showing the evener applied to an extension tongue of a draft appliance, Fig. 2 is a side elevation thereof, Fig. 3 is a vertical longitudinal sectional view therethrough, the view showing the evener arranged as a three horse evener, Fig. 4 is a perspective view of one of the locking elements, Fig. 5 is a perspective view of one of the spacing blocks, Fig. 6 is a perspective view of one of the double clevises, and Fig. 7 is a detail sectional view through the extension tongue, showing the means for connecting the main evener bar thereto.

Like reference numerals designate corresponding parts in all the figures of the drawing.

Referring to the drawing, A designates an extension tongue of a draft appliance (not shown). This tongue is composed of upper and lower sections 5 and 6 respectively. The sections are secured together by means of bolts 7 or other suitable fastening means. Centrally formed in the abutting faces of the upper and lower sections 5 and 6 are opposed transverse recesses 8 and 9 respectively, which conjointly form an opening for receiving the main evener bar 10 of the draft evener, which is designated as a whole by the reference letter B. The top and bottom walls of the opening thus formed are laterally inclined so as to dispose the main evener bar 10 at an angle. The bar 10 is centrally formed with a vertical opening 11 which registers with an opening 12 formed in the lower section 6 and with a socket 13 formed in the upper section 5. A pivot pin 14 is loosely mounted within the openings 11 and 12 and the socket 13, and this pin is prevented from dropping out by means of a keeper 15 which is pivotally connected, as at 16, to the underface of the lower section 6.

The main evener bar 10 is formed with reduced ends 17—17 which are each formed with a plurality of spaced vertical openings 18. Each end 17 projects through a corresponding opening 19 formed in a spacing block 20, said block extending for some distance below the plane of the bar 10 and having a lower transverse opening 21 formed in its lower end. A vertical opening 22 is centrally formed in the block 20 and intersects the openings 19 and 21 thereof. A coupling pin 23 projects through the opening 22 of the block 20 and through any one of the openings 18 of the bar 10, depending of course upon the position of said block. It will thus be observed that by means of this construction, the blocks may be each shifted longitudinally along the reduced end 17 of the main evener bar. Movably mounted for horizontal swinging movement within the opening 21 of each block 20 is a double-tree 24, said tree being centrally pivoted to the coupling pin 23. It will thus be observed that by means of the spacing block, the double-trees 24 are disposed below the plane of the evener bar 10.

Associated with each double-tree 24 is a pair of swingle-trees 25—25, and each swingle-tree is connected to the respective end of a double-tree by means of a double clevis 26. This clevis includes oppositely projecting pairs of ears 27—27 and 28—28 respectively, said ears being connected centrally by means of a transverse web 29. The ears 27 are perforated, and are pivotally connected to the respective end of a double-tree by means of a bolt 30. The ears 28 are also perforated, and are respectively disposed in a plane higher than the ears 27 and have pivotal connection with a respective swingletree 25 by means of a bolt 31.

Each swingle-tree 25 has its ends formed with transverse openings in which an eye-bolt 32 is disposed, said bolt having a nut 33 associated with the free end. Loosely connected to the eye $32^a$ of each bolt is a hook 34 which is formed from a single piece of stout wire and bent to form a lap-link, the end portions 35—35 thereof being disposed in overlapping and in spaced relation, one end portion terminating in an attaching eye 36 which is engageable with the eye $32^a$ of the bolt 32.

When it is desired to use the device as a three horse evener, I employ an S-shaped locking element 37. This element has one bill $37^a$ engageable over the front edge of the stubble end of the main evener bar 10, and has its other end $37^b$ engageable under the inner end of the respective double-tree 24. The spacing block 20 is shifted outward along the reduced end 17 of said double-tree 24, and is secured in its adjusted position by means of the coupling pin 23. By this arrangement, the single horse which is on the stubble side will be given a leverage equal to the strength of two horses on the grain side. When, however, it is desired to use the appliance as a two horse evener, the double-trees are not shifted along the main evener bar, and locking elements 37 are associated with each double-tree and bar to hold said double-trees against relative movement.

The extension tongue A is pivotally connected in advance of an upwardly inclined draft pole C, and is adapted to swing horizontally in either direction. When the extension is thus swung, the draft element will operate under the tongue as will be readily observed.

What is claimed is:

1. In a draft evener, the combination with an extension tongue consisting of upper and lower sections, the inner faces of said sections being oppositely recessed to conjointly form a transverse inclined opening, and a draft element pivotally mounted in the opening.

2. In a draft evener, the combination with an extension tongue consisting of upper and lower sections, the inner faces of said sections being oppositely recessed to conjointly form a transverse inclined opening, said lower section being centrally formed with a vertical opening, a pivot pin extending upwardly through the opening of the lower section into the first mentioned opening, a draft element pivotally mounted upon said pin, and a keeper secured to the underface of the lower section and engageable with the pin for locking said pin against displacement.

In testimony whereof, I affix my signature, in presence of two witnesses.

HIRAM C. HUFF.

Witnesses:
   FRANCIS BOYLE,
   H. M. POPHAM.